No. 736,439. PATENTED AUG. 18, 1903.
S. J. & J. D. PHILLIPS.
RUNNER FOR WHEELED VEHICLES.
APPLICATION FILED JUNE 17, 1902.
NO MODEL.

WITNESSES:
C. E. McDonald
B. Patterson.

INVENTORS
S. J. Phillips
J. D. Phillips
BY Clark Deemer
ATTORNEYS

No. 736,439. Patented August 18, 1903.

UNITED STATES PATENT OFFICE.

SAMUEL JULIUS PHILLIPS AND JOHN DANIEL PHILLIPS, OF NEW YORK, N. Y.

RUNNER FOR WHEELED VEHICLES.

SPECIFICATION forming part of Letters Patent No. 736,439, dated August 18, 1903.

Application filed June 17, 1902. Serial No. 112,106. (No model.)

*To all whom it may concern:*

Be it known that we, SAMUEL JULIUS PHILLIPS and JOHN DANIEL PHILLIPS, citizens of the United States, and residents of New York, county of New York, and State of New York, have invented certain new and useful Improvements in Runners for Wheeled Vehicles, of which the following is a specification, reference being had to the accompanying drawings, forming a part thereof, in which similar letters of reference indicate corresponding parts in all the figures.

The present invention relates to that class of runners which are designed to be attached to the wheels of vehicles for imparting thereto the capability of service as a sleigh; and the more prominent objects of my improvements are to adapt the runner for ready and secure attachment to the wheel and to qualify it for application to wheels having different widths and conditions of tires and fellies.

With the above and other purposes in view the novel runner comprises an extended metal tread or bearing, preferably having an upward curve at the front to serve as a fender, and a pair of independent metal clamping-plates having base-flanges secured to the tread by a connection permitting their transverse adjustment thereon and having properly-located openings for the reception of tie-bolts, by which the runner is securely fastened to the lower portion of the wheel.

There are other important features involved in the novel runner, which will be explained in the succeeding detailed description.

Figure 1:
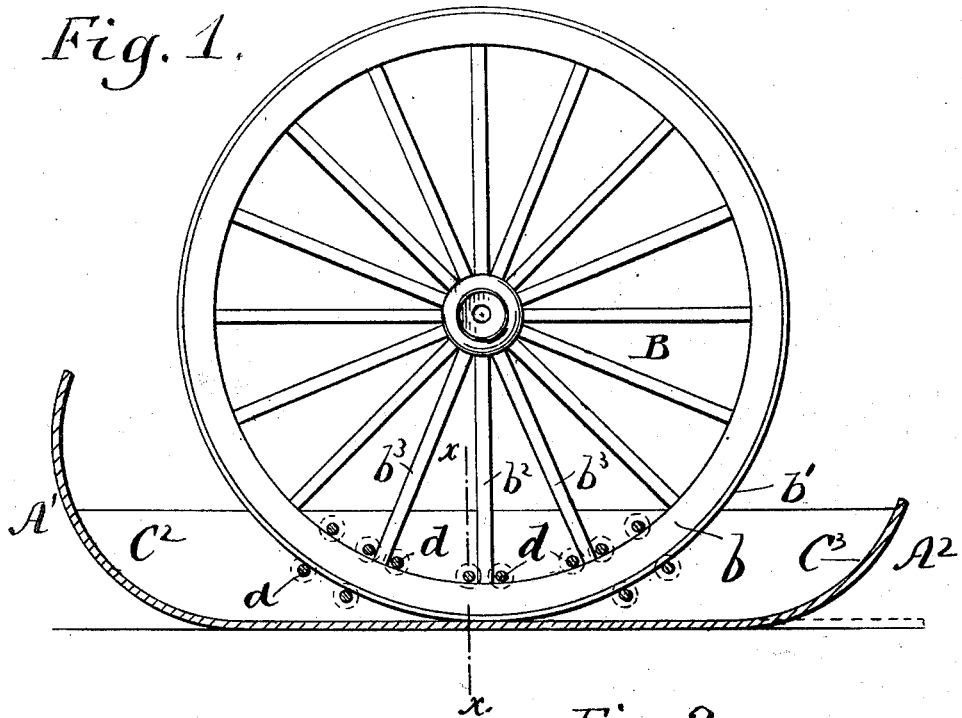
Figure 2:
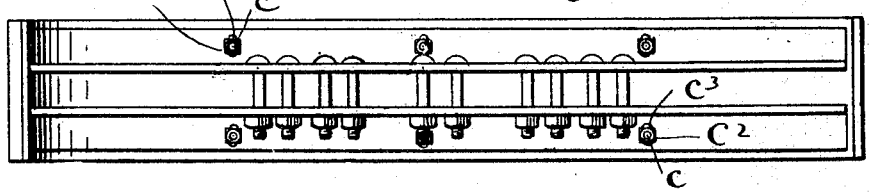

In the accompanying drawings, forming part of this specification, Figure 1 is a side view of a wheel having my novel runner attached thereto, the runner being shown in section in the plane represented by one of the sides of the wheel. Fig. 2 is a plan view of the runner and its tie-bolts; and Fig. 3 is a transverse sectional view through the runner and the lower part of the wheel, the section being taken in the plane indicated by the broken line $x\,x$, Fig. 1.

Figure 3:
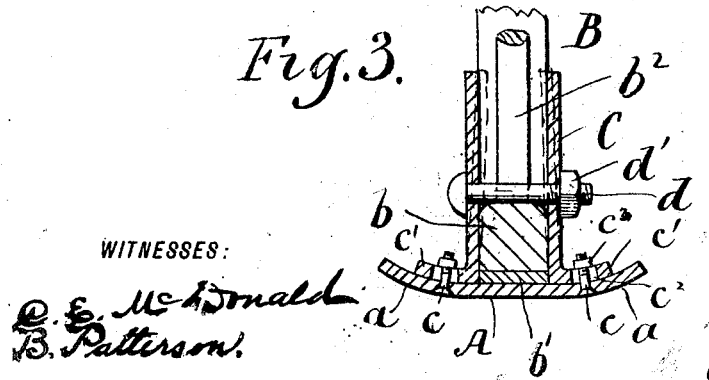

The extended longitudinal metal tread or bearing A of the runner has its sides $a\,a$ slightly upwardly curved, as shown in Fig. 3, to materially reduce the friction incurred, yet insure extended side bearing to provide against any tendency to lateral tilting that might be imparted by the varying play of the wheel B. The forward part of the runner curves upwardly to considerable extent to provide a breast or fender A'. The rear part of the bearing A may be also upwardly curved, as shown at $A^2$ in Fig. 1; but it can, if preferred, be simply horizontal.

In the bearing A, at a considerable distance at each side of its longitudinal center, are vertical perforations, which are countersunk at the under side of the bearing for the reception of the heads of the bolts $c$, which extend up through and beyond slots $c^2$ therefor in the horizontal base-flanges C' of vertical clamping-plates C C, the upper threaded ends of the bolts having nuts $c^3$ screwed thereon to firmly fasten the plates C C to the tread. These plates C C, which are made of resilient material, are of the extended longitudinal character illustrated in Figs. 1 and 2, so that by reason of their respective curved ends $C^2\,C^3$ extending to and bearing against the inner sides of the forward breast A' and rear curved part $A^2$ said plates possess the additional function of bracing these parts relative to both the tread and the connection of the latter with the wheel. Transverse bolt-openings in the plates C are so located as to insure that the bolts $d$, which pass therethrough and take nuts $d'$ on their projecting threaded ends, will intimately engage the felly $b$ and tire $b'$ of the wheel, so as to firmly secure the plates thereto.

As shown most clearly in Fig. 1, the bolts $d$ are so disposed that when the felly and tire rest upon the tread A between the plates C C, the bottom bolts of the latter being adjusted and secured to positively hold said plates against the respective sides of the wheel, felly, and tire, a central pair of said bolts $d$ will firmly confine between them one of the spokes $b^2$ of the wheel, while the lowest portion of the felly and tire of the latter will be firmly held between said bolts and the tread. The other bolts $d$ are shown as being arranged in two groups at either side of said central pair, there being a group both at the front and rear of said central pair and the bolts of each group disposed so as to intimately engage the felly and tire at inner and outer points thereof. An inner pair of the bolts of each group also rigidly clamps a contiguous spoke $b^3$ of the wheel.

With the runner constructed and connected to the wheel as described the former will serve efficiently, while both will be firmly braced relative to each other and all tendency of the wheel to turn resisted.

The adjustable connection of the plates C on the tread A, whereby the transverse positions of said plates may be varied, admits of the ready application to wheels having fellies and tires of different thicknesses. With a view of causing the plates C to even more intimately clamp the lower portion of the wheel, even if the side faces of the same should be irregular or the felly and tire of varying degree of thickness, we make said plates resilient in order that they will efficiently accommodate themselves to the contiguous portions of the wheel when clamping the same and so that by reason of their resilience they will ease the side jolt which is common to rigid mechanism of this class.

From the foregoing description it will be appreciated that a wheel-runner embodying our invention is highly useful, comparatively simple and inexpensive, of great durability, and can be conveniently adjusted and removed.

We do not desire to be understood as limiting ourselves to the particular construction and arrangement of parts disclosed, as the same may be modified or changed and still be within the spirit of our invention.

Having now described our invention, what we claim as new, and desire to secure by Letters Patent, is—

In a runner for wheeled vehicles, the combination with the tread A, having front fender A', and rear fender $A^2$, and bent upwardly at its sides $a$, $a$, of the resilient adjustable and removable clamping-plates C, C, extending between said fenders having curved ends $C^2$, $C^3$, flanges $c'$, the transverse slots $c^2$, and transverse bolt-holes, the bolts $c$, passing through the tread A, and the slots $c^2$, of the flanges $c'$, of the plates C, and the nuts $c^3$, together with said bolts $c$, adjustably and separately securing the said resilient plates C, to said tread, the transverse bolts $d$, which pass through the said resilient plates C, and the nuts $d'$, which together with said last-named bolts, bind the runner to a vehicle-wheel.

In testimony that we claim the foregoing as our invention we have signed our names, in the presence of two witnesses, this 14th day of May, 1902.

SAMUEL JULIUS PHILLIPS.
JOHN DANIEL PHILLIPS.

Witnesses:
JOHN KEIM, Jr.,
JAMES M. DALZIEL.